(12) United States Patent
Leibman

(10) Patent No.: US 6,301,745 B1
(45) Date of Patent: Oct. 16, 2001

(54) SLIDING BUSHING WITH SPRING

(75) Inventor: Bernard Leibman, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/434,930

(22) Filed: Nov. 5, 1999

(51) Int. Cl.$^7$ ...................................................... F16L 5/00
(52) U.S. Cl. .................. 16/2.1; 403/12; 384/215
(58) Field of Search ................................ 16/2.1; 355/407, 355/40; 384/215; 403/327, 12, 229

(56) References Cited

U.S. PATENT DOCUMENTS

| | | | |
|---|---|---|---|
| 3,939,535 | 2/1976 | Matsuura | 24/283 |
| 3,940,839 | 3/1976 | Stevens | 29/208 F |
| 4,344,205 | * 8/1982 | Latino et al. | 16/2.1 X |
| 4,607,795 | 8/1986 | Ettlinger et al. | 239/530 |
| 4,634,320 | 1/1987 | Itzov | 408/136 |
| 4,648,112 | 3/1987 | Sharp, Jr. | 379/435 |
| 4,737,048 | * 4/1988 | Herrstrom | 403/209 |
| 4,998,089 | 3/1991 | Hochholzer | 338/162 |
| 5,313,934 | 5/1994 | Wilta et al. | 128/4 |
| 5,469,121 | 11/1995 | Payet-Burin | 335/16 |
| 5,492,430 | * 2/1996 | Jones | 403/325 X |
| 5,667,330 | * 9/1997 | Henkel et al. | 403/328 |
| 6,092,953 | * 7/2000 | Chaptal et al. | 403/12 |

* cited by examiner

Primary Examiner—Lynne H. Browne
Assistant Examiner—John R. Cottingham
(74) Attorney, Agent, or Firm—David E. Henn; John M. Kelly

(57) ABSTRACT

A sliding bushing for providing rotational support of a rotating member and axial biasing of that rotating member. The sliding bushing includes a body portion and a biasing portion. The body portion defines an inner periphery and an outer periphery while the biasing portion extends from the body. The sliding bushing is an integral unit.

9 Claims, 3 Drawing Sheets

SLIDING BUSHING WITH SPRING

FIELD OF THE INVENTION

The present invention relates to spring-loaded sliding bushings.

BACKGROUND OF THE INVENTION

The principles of the present invention are useful in machines requiring spring-loaded sliding bushing. One such machine is an electrophotographic printer. Electrophotographic printing is a well-known and commonly used method of copying or printing documents. Electrophotographic printing is performed by exposing a light image representation of a desired document onto a substantially uniformly charged photoreceptor. In response to that image the photoreceptor discharges so as to create an electrostatic latent image of the desired document on the photoreceptor's surface. Toner particles are then deposited onto that latent image so as to form a toner image. That toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image.

Electrophotographic printers are comprised of a large number of individual components, including numerous mechanical devices. One such mechanical device is a sliding bushing. A sliding bushing is usually an assembly comprised of two separate parts, a movable bushing that retains a rotating shaft and a spring that mates with the bushing such that the bushing and the shaft are biased in an axial direction by the spring. In operation the rotating shaft is forced along an axis by an external actuator, the shaft moves, thereby moving the bushing in the axial direction, and the moving bushing stores energy in the spring. When the external actuator releases the shaft the energy stored in the spring moves the bushing and the shaft back to a predetermined position.

While sliding bushing and their applications are well known, they usually must be assembled from constitute parts. Such assembly is expensive, time consuming, and sometimes difficult. Therefore, a new type of sliding bushing that does not require assembly of individual components would be beneficial.

SUMMARY OF THE INVENTION

The present invention provide for an integral sliding bushing. A sliding bushing that is in accord with the principles of the present invention is a device for supporting an external rotating member along an axis of rotation and for biasing the rotating member along the axis of rotation. The sliding bushing includes an integrally molded body and biasing portion. The body defines an inner periphery and an outer periphery while the biasing portion extends from the body for mating to a support structure.

In accordance with another aspect of the present invention, there is provided a pinch wheel assembly suitable for use in aligning media in a media tray. The pinch wheel assembly includes a housing, a wheel assembly within the housing and having an elongated shaft and wheels, and a sliding bushing, also within the housing, that biases the wheel assembly along the axis of elongation. The sliding bushing includes an integrally molded body and biasing portion. The body defines an inner periphery and an outer periphery while the biasing portion extends from the body to a wall of the housing.

In accordance with a further aspect of the present invention, there is provided a printing machine of the type having a sliding bushing for providing rotational support of a rotating member and for biasing that rotating member along an axis of rotation. The sliding bushing includes an integrally molded body and biasing portion. The body defines an inner periphery and an outer periphery while the biasing portion extends from the body.

BRIEF DESCRIPTION OF THE DRAWINGS

The invention will be described in detail herein with reference to the following figures in which like reference numerals denote like elements and wherein.

DETAILED DESCRIPTION OF A PREFERRED EMBODIMENT OF THE INVENTION

Figure 1:
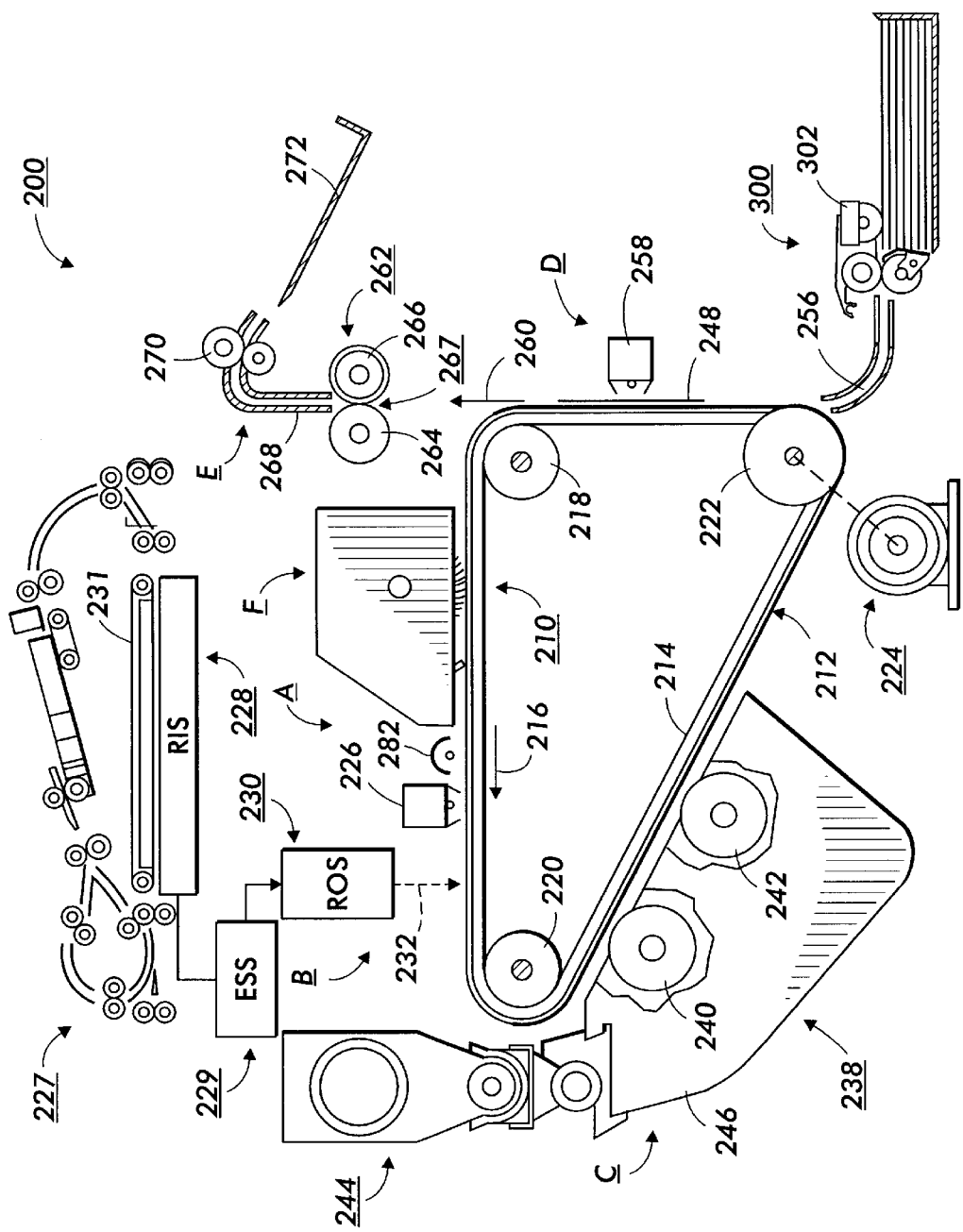
FIG. 1 is a schematic view of an exemplary printing machine utilizing a sliding bushing according to the present invention.

The principles of the present invention provide for an integral sliding bushing that is suitable for use in electrophotographic printing machines since those machines often include rotating shafts that move axially. FIG. 1 illustrates a digital copier 200 having an original document positioned in a document handler 227 of a raster input scanner 228. The raster input scanner contains a cover 231, a document holding platen, document illumination lamps, optics, a mechanical scanning drive, and a charge coupled device (CCD) array. The raster input scanner converts the image on the original document into digital image information. That information is transmitted to an electronic subsystem 229 that converts the digital information to a proper format for a raster output scanner 230 as described below. The electronic subsystem also contains a user interface that enables an operator to implement operator adjustable copy parameters. The user interface may be a touch screen, push buttons, or any other suitable input device.

The digital copier further includes a belt 210 having a photoconductive surface 212 deposited on a conductive ground layer 214. The belt 210 moves in the direction 216 so as to advance successive portions of the photoconductive surface 212 sequentially through the various processing stations disposed about the belt. The belt 210 is entrained about a stripping roll 218, a tensioning roll 220, and a drive roll 222. A motor 224 rotates the drive roll 222 such that the belt advances in the direction 216.

Initially, a portion of the belt 210 passes through a charging station A. There a corona generating device 226 charges the photoconductive surface 212 to a relatively high, substantially uniform potential. After the photoconductive surface is charged, the charged portion is advanced through an exposure station B.

At exposure station B the electronic subsystem 229, which beneficially includes a dedicated minicomputer, causes the raster output scanner 230 to produce a modulated laser beam 232. The raster output scanner includes a rotating, multifaceted polygon mirror and optical systems that sweep the modulated laser beam as a light spot across the photoconductive surface. The sweeping of the laser beam 232 together with the advancement of the belt in the direction 216 cause the charged photoconductive surface to be raster scanned by the modulated laser beam, thereby recording an electrostatic latent image. The electronic subsystem 229 controls the laser beam modulation such that an electrostatic latent image of the original document is produced.

After being recorded, the electrostatic latent image advances to a development station C. There toner, in the form of liquid or dry particles, is electrostatically deposited on the electrostatic latent image using well known techniques. Preferably, the development station C uses a magnetic brush developer 238 having magnetic brush developer rolls 240 and 242. Those rolls form a brush of carrier granules and toner particles that extend near the photoconductive surface. The latent image attracts toner particles from the carrier granules, forming a toner powder image. The magnetic brush developer further includes a toner particle dispenser 244 that dispenses toner particles into a developer housing 246 as required.

After the electrostatic latent image is developed, the toner image advances to a transfer station D. Additionally, a substrate 248, such as a sheet of paper, is also advanced to the transfer station D along a paper path 256 via a substrate feeding apparatus 300. The substrate feeding apparatus includes a wheel assembly 302 that includes a sliding bushing that is in accord with the principles of the present invention. That wheel assembly and the sliding bushing are described in more detail subsequently. From the substrate feeding apparatus 300 the substrate 248 is directed into contact with the photoconductive surface 212. Substrate advancement is timed such that the substrate 248 overlaps the toner powder image as the belt advances. The transfer station D includes a corona generating device 258 that sprays ions onto the back side of the substrate 248. This causes toner to transfer from the photoconductive surface 212 onto the substrate 248. After transfer, the substrate 248 advances in the direction 260 into a fusing station E.

The fusing station E includes a fuser assembly 262 that permanently affixes the transferred toner to the substrate 248. The fuser assembly 262 includes a heated fuser roll 264 and a back-up roll 266 that form a nip 267. The substrate 248 passes between the fuser roll 264 and the back-up roll 266 such that the toner contacts the fuser roll 264. Heat and pressure in the nip permanently affix the toner to the substrate 248. After fusing, the substrate advances through a chute 268 and a drive roll assembly 270 to a catch tray 272 for subsequent removal by the operator.

After the substrate separates from the photoconductive surface 212 there may be residual toner, paper fibers, or other debris remaining on the photoconductive surface 212. Such debris is removed at a cleaning station F. After cleaning a discharge lamp 282 floods the photoconductive surface 212 with light to dissipate any residual electrostatic charges in preparation for the next imaging cycle.

Figure 2:
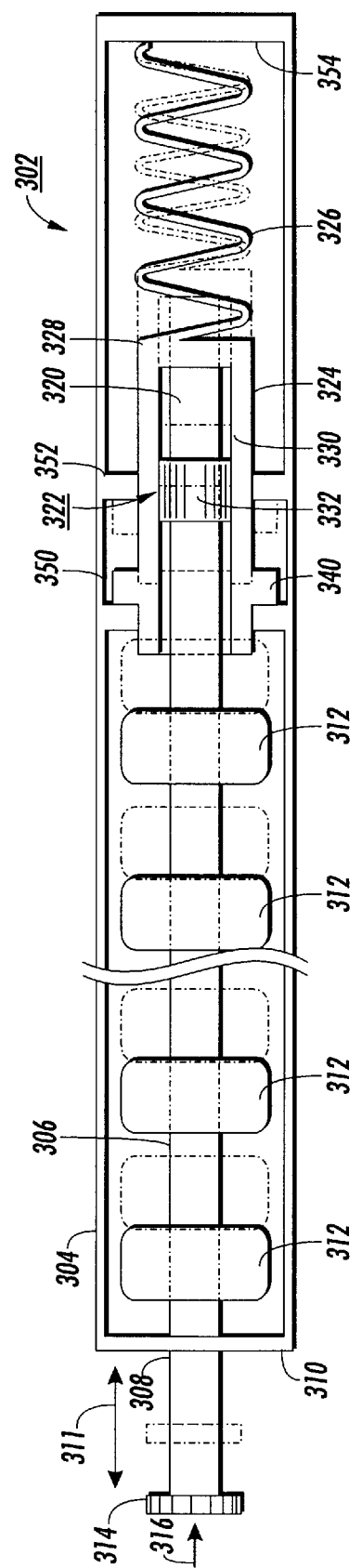
FIG. 2 is a top view of a sliding wheel assembly used in the printing machine of FIG. 1.

It is believed that the foregoing description is sufficient for purposes of the present application to illustrate the general operation of an electrophotographic printing machine suitable for incorporating the present invention. FIG. 2 illustrates the wheel assembly 302 in more detail. As shown that wheel assembly includes a housing 304 that holds a shaft 306 having an end portion 308 that extends through an opening in a housing wall 310 along an axis 311. On the shaft within the housing is a plurality of wheels 312. Those wheels are comprised of a high friction material such as a rubber or a urethane compound. At the end of the end portion 308 is a gear 314. That gear mates with an external driving gear (which is not shown). The gear 314 also mates with an actuator, such as a solenoid (which is also not shown) that selectively applies a force in the direction 316.

Figure 3:
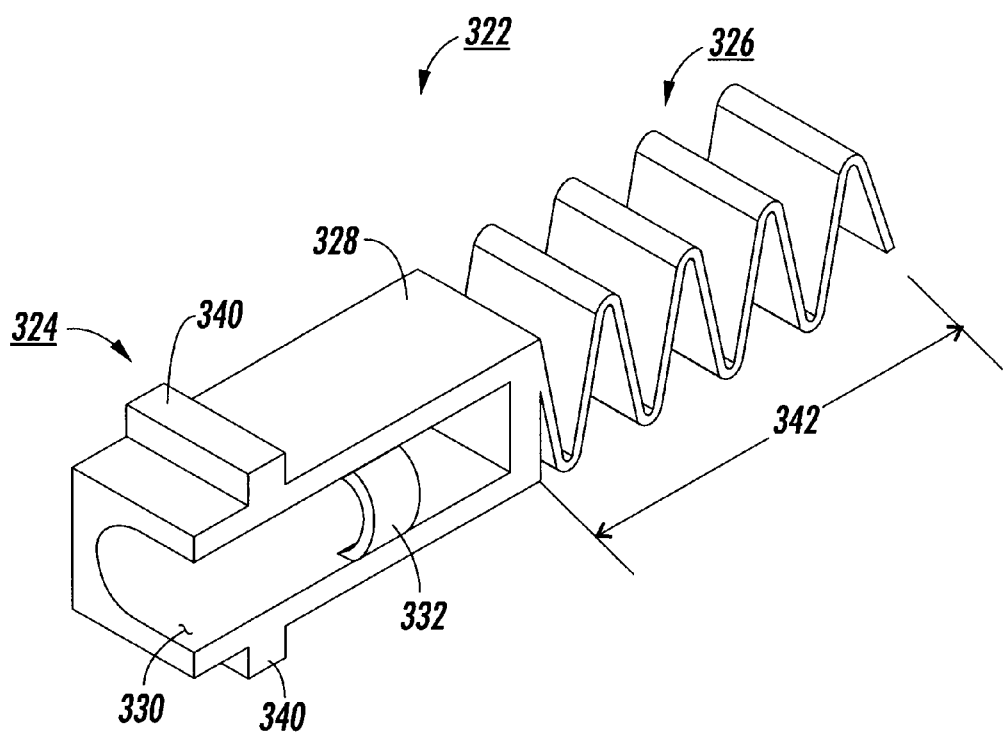
FIG. 3 is an isometric view of a sliding bushing that is in accord with the principles of the present invention and that is used in the sliding wheel assembly shown in FIG. 2.
Figure 4:
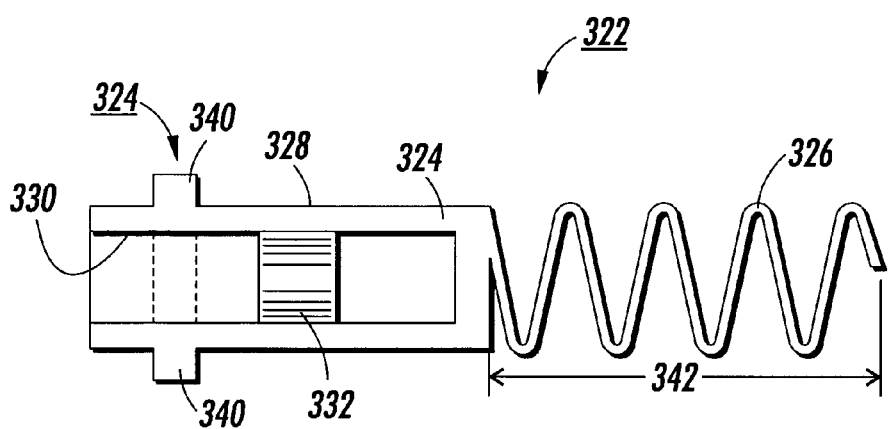
FIG. 4 is a side view of the sliding bushing of FIG. 3.

The end portion 320 of the shaft that is opposite the end portion 308 fits into a sliding bushing 322. That bushing is shown in more detail in FIGS. 3 and 4. The sliding bushing has a body portion 324 and a biasing portion 326. The body portion has an outer periphery 328 that fits inside the housing and an inner periphery 330 that receives the end portion 320. The body portion also includes a retainer 332 that prevents the end portion 320 from separating from the sliding bushing in a direction normal to the axis 311. The outer periphery includes a mechanical stop 340. The bias portion 326 is formed as a resilient spring having a natural length 342. When the bias portion is shorten or lengthen from its natural length the bias portion stores mechanical energy that seeks to return the bias portion to its natural length.

The sliding bushing 322 is an integral unit formed from molded plastic. While many plastics can be used to from the sliding bushing, for strength, wear, and cost, the sliding bushing is beneficially comprised of nylon. Since the shaft is cylindrical and the housing is rectangular, the inner periphery is beneficially cylindrical while the outer periphery is beneficially rectangular. However, the body portion can be molded having other peripheries.

Turning back to FIG. 2, the sliding bushing 322 and the shaft 306 are inserted into the housing 304 such that the natural length of the bias portion is slightly shortened. This causes the bias portion to bias the shaft and the body portion such that mechanical stop 340 is biased toward a housing protrusion 350.

When the digital copier 200 determines that the substrate 248 is one size, say 8.5" by 11", the mechanical stop 340 is forced against the housing protrusion 350 by the bias portion 326. This causes the wheels to be in positions indicated by the solid wheel lines of FIG. 2. The wheel spacing is then such that rotation of the shaft causes smooth motion of the substrate. However, when the substrate 248 is smaller, say 5.5"×8.5", the wheel positions indicated by the solid wheel lines of FIG. 2 would be inappropriate for smooth motion and might cause rotation of the substrate. In that case, an external actuator moves the shaft 306 by applying a force in the direction 316. This moves the wheels to the positions of the dotted lines in FIG. 2 and the sliding bushing 322 such that the mechanical stop is forced against a housing protrusion 352. This compresses the bias portion 326 against a housing wall 354, thereby storing mechanical energy. Then, rotation of the shaft causes smooth motion of the smaller substrate. When the external actuator stops apply its force the bias portion releases its stored energy and returns the mechanical stop to the housing protrusion 350.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A wheel assembly suitable for moving media from a media tray, said wheel assembly including:

an elongated shaft having a first end and a second end;

a wheel on said shaft;

a sliding bushing receiving said first end of said shaft, said sliding bushing comprising a body portion and a biasing portion that are integrally connected, wherein said body portion defines an inner periphery for receiving said first end of said shaft and an outer periphery, wherein said biasing portion extends from said body portion, and wherein said biasing portion is capable of storing and releasing mechanical energy; and a housing holding said wheel, said sliding bushing, and said first end;

wherein said wheel, shaft, and sliding bushing can move axially in response to an external force, wherein axial motion of said shaft in a first direction causes mechanical energy to be stored in said biasing portion, and wherein said biasing portion biases said body portion and said shaft in a second axial direction.

2. A wheel assembly according to claim 1, wherein said housing includes an internal stop that limits the axial motion of said sliding bushing.

3. A wheel assembly according to claim 1, wherein said sliding bushing comprises a plastic.

4. A wheel assembly according to claim 3, wherein said plastic includes nylon.

5. A wheel assembly according to claim 1, wherein said shaft can rotate.

6. A wheel assembly according to claim 1, wherein said biasing portion comprises a spring.

7. A wheel assembly according to claim 1, wherein said inner periphery is substantially cylindrical.

8. A wheel assembly according to claim 1, wherein said outer periphery is substantially rectangular.

9. A wheel assembly according to claim 1, wherein said outer periphery of said body portion includes a stop.

* * * * *